United States Patent
Gorter et al.

(10) Patent No.: US 11,418,514 B2
(45) Date of Patent: Aug. 16, 2022

(54) COMMUNICATION PLATFORM FOR EXCHANGING DIGITAL DATA, GENERIC APPLICATION PROGRAMMING INTERFACE FOR SUCH A COMMUNICATION PLATFORM, AND METHOD FOR OPERATING AND USING SUCH A COMMUNICATION PLATFORM

(71) Applicant: catkin GmbH, Dortmund (DE)

(72) Inventors: Geert-Jan Gorter, Dortmund (DE); Stephan Post, Solingen (DE)

(73) Assignee: catkin GmbH, Dortmund (DE)

( * ) Notice: Subject to any disclaimer, the term of this patent is extended or adjusted under 35 U.S.C. 154(b) by 145 days.

(21) Appl. No.: 15/777,337

(22) PCT Filed: Oct. 14, 2016

(86) PCT No.: PCT/EP2016/074719
§ 371 (c)(1),
(2) Date: May 18, 2018

(87) PCT Pub. No.: WO2017/084816
PCT Pub. Date: May 26, 2017

(65) Prior Publication Data
US 2018/0262513 A1   Sep. 13, 2018

(30) Foreign Application Priority Data

Nov. 19, 2015  (DE) ..................... 10 2015 120 093.7

(51) Int. Cl.
*H04L 9/40* (2022.01)
*G06Q 10/08* (2012.01)
(Continued)

(52) U.S. Cl.
CPC ............ *H04L 63/104* (2013.01); *G06F 9/547* (2013.01); *G06F 21/6218* (2013.01);
(Continued)

(58) Field of Classification Search
CPC ..... G06F 21/6218; G06F 9/547; G06Q 10/08; G06Q 10/087; H04L 63/0876; H04L 63/104

See application file for complete search history.

(56) References Cited

U.S. PATENT DOCUMENTS 6,408,336 B1 * 6/2002 Schneider ........... H04L 63/0218
709/229
7,349,912 B2 * 3/2008 Delany ................... G06F 21/41
707/694
(Continued)

OTHER PUBLICATIONS

Search Query Report from IP.com (performed May 22, 2020).*
(Continued)

*Primary Examiner* — Sharon S Lynch
(74) *Attorney, Agent, or Firm* — Collard & Roe, P.C.

(57) ABSTRACT

A communication platform exchanges digital data within a value added chain by at least one order. Each individual order corresponds to a collaborative process and has an order structure. The collaborative process and order structure digital data are usable in communication platform modules. The communication platform also has an order structure module configuring at least one such order structure and allocating to one or more user groups for each order structure authorization to generate and/or accept such order; a client module generating, providing or releasing at least one such order, or allocating at least one user group ID to the order(s); a contractor module confirming, declining, or accepting such order and adapting the order status information; and a generic application programming interface connecting the communication platform modules such that order structure digital data is usable in all modules, and any order structure orders can be interconnected.

14 Claims, 2 Drawing Sheets

Figure 1:
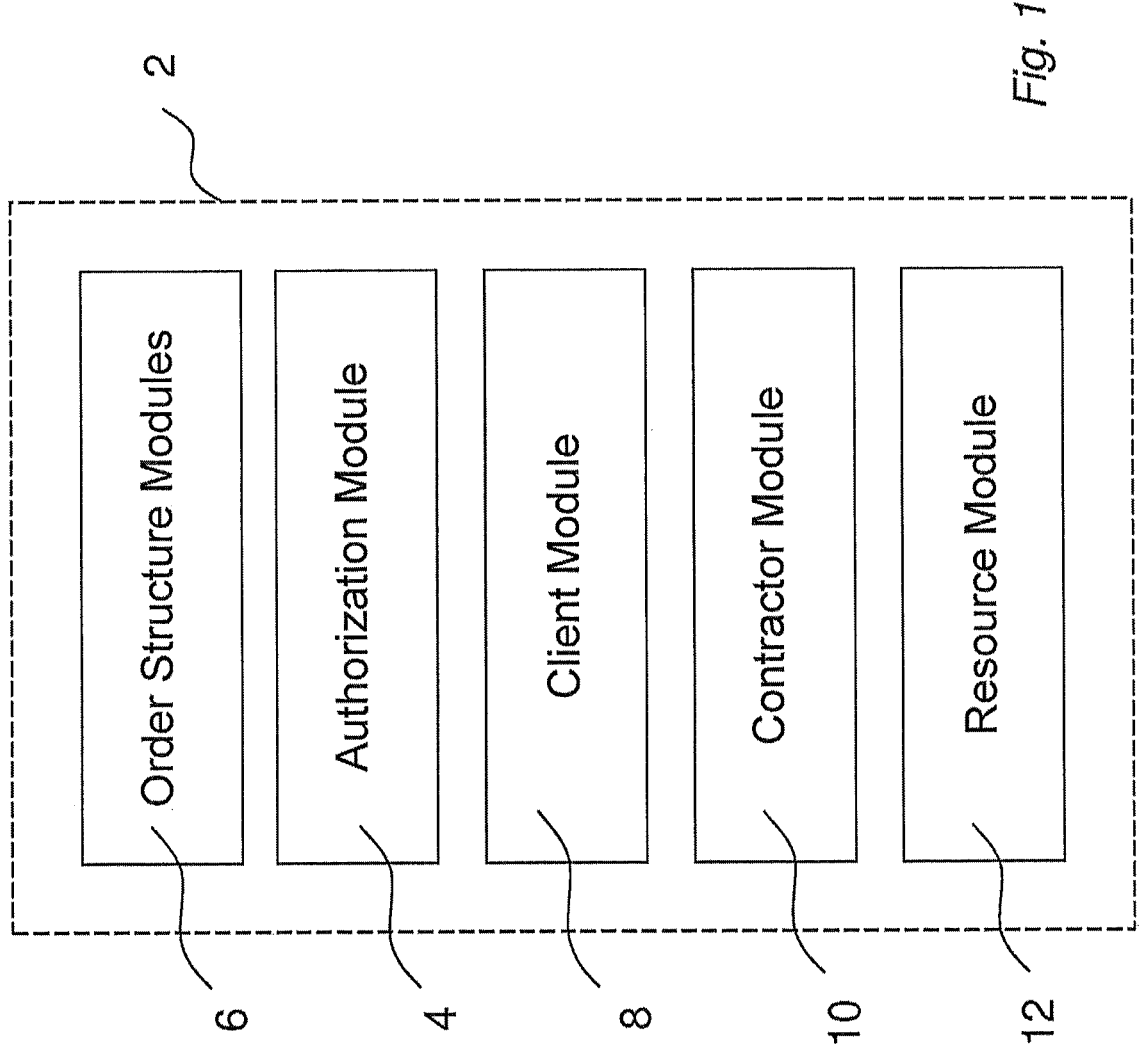

(51) Int. Cl.
*G06F 21/62* (2013.01)
*G06F 9/54* (2006.01)

(52) U.S. Cl.
CPC ........... *G06Q 10/08* (2013.01); *G06Q 10/087* (2013.01); *H04L 63/0876* (2013.01)

(56) References Cited

U.S. PATENT DOCUMENTS

| | | | | |
|---|---|---|---|---|
| 7,363,339 B2* | 4/2008 | Delany | G06F 21/41 | 709/202 |
| 7,613,794 B2* | 11/2009 | Delaney | G06F 21/31 | 707/999.003 |
| 7,673,047 B2* | 3/2010 | Delany | G06F 21/41 | 709/225 |
| 7,925,550 B2* | 4/2011 | Kataria | G06Q 10/087 | 705/28 |
| 7,971,141 B1* | 6/2011 | Quinn | G06F 40/183 | 715/721 |
| 8,032,431 B2* | 10/2011 | Kataria | G06Q 30/018 | 705/28 |
| 8,082,301 B2* | 12/2011 | Ahlgren | G06F 9/468 | 709/204 |
| 8,290,808 B2* | 10/2012 | Brower, Jr. | G06Q 10/06313 | 705/7.27 |
| 8,805,879 B2* | 8/2014 | Kelley | G06Q 10/06 | 707/779 |
| 8,850,385 B2* | 9/2014 | Ahlgren | G06F 9/468 | 717/104 |
| 10,268,978 B2* | 4/2019 | Gajdzinski | G06Q 10/06375 | |
| 10,387,439 B2* | 8/2019 | Vasudev | G06Q 30/016 | |
| 10,504,063 B2* | 12/2019 | Walter | G06F 8/656 | |
| 10,628,769 B2* | 4/2020 | Gajdzinski | G06Q 10/063 | |
| 2002/0049622 A1* | 4/2002 | Lettich | G06Q 10/08 | 705/7.11 |
| 2002/0129135 A1* | 9/2002 | Delany | H04L 63/105 | 709/223 |
| 2002/0138543 A1* | 9/2002 | Teng | G06F 21/6218 | 718/102 |
| 2002/0138572 A1* | 9/2002 | Delany | G06F 21/41 | 709/204 |
| 2002/0138763 A1* | 9/2002 | Delany | G06F 21/41 | 726/6 |
| 2002/0152254 A1* | 10/2002 | Teng | G06F 21/41 | 718/100 |
| 2002/0156879 A1* | 10/2002 | Delany | H04L 67/2852 | 709/223 |
| 2002/0175940 A1* | 11/2002 | Lection | G06F 3/0482 | 715/764 |
| 2003/0074238 A1* | 4/2003 | Hoffman | G06Q 30/0633 | 705/7.31 |
| 2003/0074262 A1* | 4/2003 | Hoffman | G06Q 30/0202 | 705/7.31 |
| 2004/0010591 A1* | 1/2004 | Sinn | H04L 63/0263 | 709/225 |
| 2004/0010606 A1* | 1/2004 | Delaney | G06F 21/31 | 709/229 |
| 2004/0181578 A1* | 9/2004 | Elms | H04L 67/14 | 709/205 |
| 2005/0015166 A1* | 1/2005 | Kataria | G06Q 10/087 | 700/99 |
| 2005/0278294 A1* | 12/2005 | Beartusk | G06Q 10/10 | |
| 2006/0064344 A1* | 3/2006 | Lidow | G06Q 10/06 | 705/7.31 |
| 2006/0190391 A1* | 8/2006 | Cullen, III | G06Q 10/10 | 705/37 |
| 2006/0195575 A1* | 8/2006 | Delany | G06F 21/6218 | 709/225 |
| 2007/0168530 A1* | 7/2007 | Delaney | G06F 21/31 | 709/229 |
| 2007/0192715 A1* | 8/2007 | Kataria | G06F 19/326 | 715/764 |
| 2008/0016546 A1* | 1/2008 | Li | G06F 21/6218 | 726/1 |
| 2009/0012828 A1* | 1/2009 | Brower, Jr. | G06Q 10/06 | 705/7.23 |
| 2009/0132285 A1* | 5/2009 | Jakobovits | G06F 3/0482 | 705/3 |
| 2009/0320035 A1* | 12/2009 | Ahlgren | G06F 9/468 | 718/104 |
| 2010/0312691 A1* | 12/2010 | Johnson, Jr. | G06Q 40/025 | 705/38 |
| 2010/0318511 A1* | 12/2010 | Phan | G06Q 10/103 | 707/722 |
| 2011/0004621 A1* | 1/2011 | Kelley | G06F 16/21 | 707/769 |
| 2011/0196977 A1* | 8/2011 | Lynch | H04W 8/186 | 709/229 |
| 2011/0276914 A1* | 11/2011 | Ahlgren | H04L 67/306 | 715/771 |
| 2012/0047078 A1* | 2/2012 | Walter | G06Q 10/103 | 705/301 |
| 2013/0006700 A1* | 1/2013 | Brower, Jr. | G06Q 10/06 | 705/7.27 |
| 2013/0218629 A1* | 8/2013 | Brower, Jr. | G06Q 10/06 | 705/7.23 |
| 2014/0019187 A1* | 1/2014 | Olsen | G06Q 10/06313 | 705/7.23 |
| 2014/0222522 A1* | 8/2014 | Chait | G06Q 10/0637 | 705/7.36 |
| 2014/0278594 A1* | 9/2014 | Vivadelli | G06Q 10/02 | 705/5 |
| 2014/0372536 A1* | 12/2014 | Ahlgren | G06Q 10/10 | 709/205 |
| 2015/0032778 A1* | 1/2015 | Kelley | G06F 16/24 | 707/803 |
| 2015/0120359 A1* | 4/2015 | Dongieux | G06F 16/285 | 705/7.15 |
| 2015/0310484 A1* | 10/2015 | Haile | G06Q 30/0246 | 705/14.45 |
| 2016/0125068 A1* | 5/2016 | Dongieux | G06Q 10/063114 | 707/740 |
| 2016/0352812 A1* | 12/2016 | Ahlgren | G06Q 10/10 | |
| 2017/0076295 A1* | 3/2017 | Vasudev | H04L 41/5064 | |

OTHER PUBLICATIONS

Search Query Report from IP.com (performed Dec. 17, 2020) (Year: 2020).*
Search Query Report from IP.com (performed Sep. 8, 2021) (Year: 2021).*
Search Query Report from IP.com (performed May 5, 2022) (Year: 2022).*
International Search Report of PCT/EP2016/074719, dated Jan. 12, 2017.

* cited by examiner

COMMUNICATION PLATFORM FOR EXCHANGING DIGITAL DATA, GENERIC APPLICATION PROGRAMMING INTERFACE FOR SUCH A COMMUNICATION PLATFORM, AND METHOD FOR OPERATING AND USING SUCH A COMMUNICATION PLATFORM

CROSS REFERENCE TO RELATED APPLICATIONS

This application is the National Stage of PCT/EP2016/074719 filed on Oct. 14, 2016, which claims priority under 35 U.S.C. § 119 of German Application No. 10 2015 120 093.7 filed on Nov. 19, 2015, the disclosure of which is incorporated by reference. The international application under PCT article 21(2) was not published in English.

The invention pertains to a communication platform for exchanging digital data by means of at least one order within a value added chain, a generic application programming interface for such a communication platform, a method for operating such a communication platform and a utilization of such a communication platform.

The communication along a value added chain, e.g. between supplier and carrier, between carrier and producer and between producer and customer, is continuously becoming more complex and more diverse. The digital transformation of this value added chain creates a new form of collaboration or cooperation beyond company boundaries, which can be combined into collaborative processes.

Various existing cloud-based solutions, in which the storage of data, as well as the execution of programs, takes place in a remote computer center, are available for linking cross-company collaborative processes, in which multiple partners cooperate. In such isolated applications, a supplier makes available resources and a user utilizes these resources, wherein the control of the resources is centralized. As a result, providers and users, such as service providers and customers, are fix connected to such a system. When users or service providers change, e.g. when service providers work for several customers or customers use several service providers, they are forced to constantly switch between the different systems.

Furthermore, the links between individual partners in the collaborative processes required for a digital data exchange are conventionally realized statically, i.e. the process structures or order structures within an interface, which allow the exchange of commands and data between different processes, are hard-coded or permanently embedded in the program code. However, this only makes it possible to map a limited number of predefined order structures, the modification or expansion of which is associated with significant development effort.

Consequently, the invention is based on the objective of improving the exchange of digital data within a value added chain in order to link collaborative processes of the type described above with reference to the prior art, and therefore partners within the value added chain, in a particularly simple fashion, wherein a collaborative process describes the digital transformation of the information flow for planning and performing an actual physical service and a collaborative process therefore corresponds to an order. Consequently, instead of "collaborative process" the term "order" is mostly used hereafter in order to simplify the readability, wherein the term "order" should not be interpreted in the commercial sense, but rather as describing a collaborative process of the above-described type.

According to the invention, this objective is achieved by means of a communication platform with the features disclosed herein, a generic application programming interface with the features disclosed herein, a method for operating such a communication platform with the features disclosed herein and a utilization of such a communication platform with the features disclosed herein.

According to the invention the communication platform is a cross-company and system-independent platform, by means of which a value added chain can be modelled, e.g. for transportation processing. In this connection, the value added chain describes the processes, which a product or a service undergoes from the starting material resp. original order up to the ultimate utilization or ultimate order processing. The companies participating in the value added chain are linked by means of flexible order structures.

The inventive communication platform enables the exchange of digital data within a value added chain by means of at least one order, wherein each individual order corresponds to a collaborative process, the digital data of which can be used in modules of the communication platform. In this context, a collaborative process describes the digital transformation of the information flow accompanying the planning and performing an actual physical service. Furthermore, each individual order is associated with an order structure, the digital data of which can likewise be used in modules of the communication platform. For this purpose, the communication platform features an "order structure" module that is designed for configuring one, two or more order structures. The configuration takes place based on individual processes of the type that occur within a value added chain, particularly order processes between a client and a contractor.

The "order structure" module is furthermore designed for granting an authorization to create an order and/or an authorization to accept an order to one or more user groups for each order structure. The individual partners in the collaborative processes, e.g. individual company departments of the participating companies, advantageously are indirectly connected by these process authorizations because a typical order structure is associated with a "create" authorization for certain company departments and an "accept" authorization for other company departments. In this way, potential contractors can query potential clients, as well as yet unassigned released orders for certain order types, and potential clients can query potential contractors, as well as capacity availabilities reported by contractors, for certain order types.

The "order structure" module is furthermore designed to authorize at least one partner and/or user group ID participating in the value added chain to create an order and to authorize at least one other partner and/or user group ID to accept an order. In this case, a partner is preferably a company or company department of a company with an associated user group ID, which participates in the value added chain.

In order to exchange digital data, the inventive communication platform furthermore features a client module that is designed for creating at least one order. This order is created by selecting an order structure, for which the user group ID has the required "create" authorization, and contains workflow information items, with which one status information item can be associated at a time.

Consequently, relevant status information on the individual orders is advantageously made accessible to all partners, e.g. partners in a transport or supply chain. In this case, the access of the partners to all status information on the orders is given in real time, wherein the term "real time" refers to processing with a minimal time delay in comparison with reality. Since the status information is accessible to all authorized partners, the status information can also be advantageously tracked across one or more company boundaries such that transparency on the respective status of orders is achieved.

The "client" module is furthermore designed for assigning the order or the orders to at least one user group ID, wherein the user group ID is associated with an entity authorized to accept the order or orders, particularly a company or department. However, the assignment takes place in dependence on the authorization to the underlying order structure such that the order can only be assigned to user group IDs, which have the associated authorization to accept an order, particularly an "accept" authorization.

If the order is not assigned to any separate user group ID, the order can be explicitly released and thereby made available for acceptance to multiple contractors. An arbitrary link between a user group ID and an order can be produced if the user group ID has the corresponding authorization.

Finally, the client module is configured to release an order assigned to a user group ID or an order accepted by a user group ID, which has been previously made available, for further processing. With this release, the order is no longer available for other participants. The release of the order can occur implicitly by assigning the order.

Additional information such as order details can be exchanged between the user group ID on the client side and the user group ID on the contractor side by means of an optional message field linked to the order, wherein the respective user inputs the information by means of suitable input means. On the contractor side, such messages can optionally also be internally communicated between user groups, e.g. between an order acceptance dispatcher and an executing resource (human or machine) assigned to the order.

The inventive communication platform furthermore features a "contractor" (=partner who is authorized to accept an order) module for exchanging digital data, that is designed for confirming or rejecting an order allocated to a user group ID. In addition, the contractor module is designed for reporting interest in being assigned to an order that was created and released by the contractor module. In the case of a confirmed or accepted order, the contractor module is furthermore designed for modifying the status information on the order accordingly.

The inventive communication platform ultimately also features a generic application programming interface (API), by means of which the modules of the communication platform, particularly the "order structure" module, the "client" module and the "contractor" module, are linked in such a way that digital data of the order structure can be used in all modules and a specific order can be used by the client module and the contractor module. The modules are furthermore linked in such a way that digital data can be transmitted between the modules by means of at least one order and orders having arbitrary order structures can be linked to each other. From a user's point of view, an order in the contractor module can therefore be advantageously accessed in the client module. However, associations between various orders within client and contractor modules are also possible.

Due to this generic application programming interface, different order structures, particularly order structures of different formats, can be advantageously associated with one another such that all authorized partners can flexibly access these orders and seamless collaboration can be achieved across one or more company boundaries. In this case, the individual modules of the communication platform are connected to each other by means of the application programming interface in such a way that digital data, e.g. status information on the orders, can be exchanged between the modules in real time, i.e. with minimal time delay.

The inventive communication platform advantageously makes it possible to improve the exchange of digital data within a value added chain in order to link collaborative processes and therefore indirectly link partners within the value added chain in a particularly simple way. These links make it possible to efficiently exchange information on business processes, which are implemented by different systems, by means of different order structures and to make these business processes available to other companies, departments, persons and/or machines without requiring direct agreements between the different participating systems.

Furthermore, the association between different order structures is improved to the effect that the status information on the individual orders as a function of the corresponding workflow progress information is accessible to any authorized partner in the linked collaborative process network at any time.

According to an enhancement of the invention, the communication platform features a resource module that is designed for assigning mobile resources—human or machine—to at least one order and for making available digital data of said at least one order to the communication platform. The resource module is preferably subordinate to the contractor module. In this case, the resource module is designed for confirming an order or partial order assigned to a resource in the contractor module and for transmitting corresponding digital data, e.g. order instruction information and GPS position data, by means of the mobile resource.

In an enhancement of the invention, the communication platform features an authorization module that is designed for setting up two different authorization levels for accessing the communication platform, wherein an administrator authorization is designed for granting access to administrative tasks within the communication platform and a processing authorization is designed for granting access to operational tasks within the communication platform. Since the administrative tasks are separated from the operating tasks within the communication platform, the efficiency of complex processes is advantageously increased because unnecessary activities in the administration and duplicate inputs are prevented. Furthermore, this separation advantageously increases the efficiency of the communication platform due to a specialization in certain areas and a high degree of security by setting up authorizations.

According to an enhancement of the invention, the authorization module is furthermore designed for authenticating access to the communication platform based on an administrator ID, a user group ID and/or a resource ID. The log-on to the communication platform is therefore advantageously realized in a centralized fashion for all partners by means of the generic application programming interface such that the partners are linked by their associated authorizations based on the order structures.

According to an enhancement of the invention, the order structure can be configured by means of the order structure module during the ongoing operation of the communication platform, i.e. during its run-time. Since the order structure is configured and released online, ad hoc processes advantageously can be automatically modified and/or added in the background quickly and without downtimes of the communication platform. However, the invention is not limited to an online configuration of the order structures by means of the generic application programming interface, wherein new order structures can be alternatively configured and activated without downtimes of the communication platform by directly registering modifications and/or additions in a corresponding database. However, this does not represent the preferred method.

In an enhancement of the invention, an order has a timeframe with a start time and a completion time, wherein this timeframe can be defined when the order is created by means of the client module or at a later time, but prior to the acceptance of the order by means of the contractor module. Due to a precise recording of the actual time of the individual orders in the contractor module, status information can be created as a function of these time records. This also results in other advantages such as the option of recording the working time of mobile employees or the evaluation of performance data.

According to an enhancement of the invention, the order structure has one or more fields, wherein predefined processing modes and/or mandatory inputs are assigned to the fields during the configuration of the order structure. In this case, the order structure features one or more master levels and detail levels with one, two or more fields. A processing mode can be allocated to the individual fields during the configuration, wherein this processing mode indicates whether the respective field is intended for further processing. Furthermore, one or more mandatory inputs can be allocated to the individual fields during the configuration in accordance with the workflow progress information to be processed or in accordance with the processing of the process steps up to the completion of the order. For example, the configuration of the order structure is used to define whether a corresponding field should be transmitted to a mobile device. Consequently, individual fields can be selectively processed with special application programs (which in the relevant technology are sometimes simply referred to as applications) such that individual order structures can be advantageously processed more efficiently.

An enhancement of the invention proposes a communication platform, in which recorded actual data forms a mandatory input of a field of the order structure and status information on the order can be created based on this actual data. In this way, the entire workflow of an individual process can be advantageously monitored by all authorized partners.

According to an enhancement of the invention, an order can be separated into multiple partial orders. Due to the sub-division of an order into multiple partial orders with different structures, it is possible, e.g., to link a contractor with one or more subcontractors by means of corresponding partial orders. The inventive communication platform advantageously makes it possible to forward the orders to one or more subcontractors in a particularly simple way, wherein the order status can always be tracked based on the status information on the order.

According to an enhancement of the invention, one or more GPS trackers can be assigned to an order, wherein a GPS tracker of the mobile employee and a GPS tracker of the machine, e.g. a vehicle, is assigned to an order and can be respectively tracked individually. The assignment takes place for tasks, the acceptance of which has been confirmed and which preferably have the status information "in processing". Position data is collected by means of the GPS trackers in accordance with the workflow progress information in a specific process step. This position data advantageously makes it possible to carry out a comparison of traveling times and/or to determine when a geographical area is entered and/or exited. In addition, an estimated arrival time can be advantageously calculated based on the current position data.

According to an enhancement of the invention, working times can be registered by means of the communication platform, wherein these working times are order-independent or assigned to an order. Such working times can advantageously also be taken into consideration in generating data on services rendered in order to monitor the running personnel costs of a process.

In the inventive communication platform, at least two, three or more of the above-described enhancements can be combined with one another in order to obtain meaningful combinations of features within the scope of the invention.

The inventive communication platform advantageously provides an interoperable platform that allows the exchange of digital data within a value added chain despite the use of different application standards by the individual partners in the value added chain, wherein ad hoc processes can be modified or added quickly and without downtimes of the communication platform.

Another advantage of the communication platform can be seen in the facility for invoice control. By means of a continuous invoice verification which is linked via the application programming interface and based on actual service data, particularly service data on enumerated service types, it is possible to determine both the revenue and the running costs within a process at any time. Cost changes implemented in an order currently being processed must be released by the other party. The communication platform allows uniform, structured communication between the partners and therefore supports the deployment planning of mobile resources at the personnel and machine level.

The above-defined objective of the invention is furthermore achieved by means of a generic application programming interface (API) for a communication platform of the type described above, wherein the modules of the communication platform, particularly the order structure module, the client module and the contractor module, are linked by means of the application programming interface (API) in such a way that digital data of the order structure can be used in all modules and a specific order can be used by both the client module and the contractor module. The modules are furthermore connected in such a way that digital data can be transmitted between the modules by means of at least one order, and orders having arbitrary order structures can be associated with one another.

Due to the utilization of the generic application programming interface (API), the order structures can be configured instead of having to be programmed. Due to the lack of "hard-coded" order structures in the configuration of the order structures, orders from different sectors can advantageously be easily and efficiently supported and, if so required, associated with one another.

The above-defined object of the invention is furthermore achieved by means of a method for operating a communication platform of the type described above, wherein at least one order structure is initially configured by means of an order structure module, and wherein no data model changes, program code modifications and/or updating time windows are required for the configuration of new order structures.

In the next processing step, at least one authorization for each order structure is granted to one or more user groups, particularly an authorization to create an order and/or an authorization to accept in order.

Subsequently, at least one order is created by means of a client module, wherein this order is created by selecting an order structure, which has the required "create" authorization, and wherein the order contains workflow progress information, with which status information can be respectively associated.

The order or orders is/are furthermore assigned to at least one user group ID in the form of a contractor by means of the client module, wherein this allocation takes place with consideration of an authorization to accept the order assigned to the order structure or the order or orders is/are made available for assignment to at least one user group ID by means of the client module.

In the next processing step, the assigned order is confirmed or rejected by means of a contractor module. Alternatively, interest in the assignment of an order is reported by means of a contractor module. In the case of a confirmed or accepted order, the order is processed in accordance with at least one workflow progress information item assigned to the order and the status information associated with the workflow progress information is adapted, if applicable, with consideration of available detailed information, e.g. GPS position data, starting and completion time, break period, recorded measuring data and the like.

If the order was previously confirmed and completed in accordance with the workflow progress information, the completion of the order is reported by means of the contractor module.

In the inventive method, the exchange of digital data within a value added chain by means of a generic application programming interface (API) is realized in such a way that the status information on the orders is accessible to at least two of the modules of the communication platform. Since the authorized partners are linked by means of flexibly created orders, the efficiency of workflow processes, particularly collaborative processes, is advantageously increased and the costs within the value added chain are lowered. Furthermore, orders from different sectors advantageously can be unproblematically and efficiently supported and, if so required, associated with one another due to the lack of "hard-coded" order structures in the configuration of the order structures.

The above-defined object of the invention is furthermore achieved by the use of a communication platform of the type described above, wherein the communication platform is preferably used for exchanging digital data in order to link collaborative processes and therefore partners within the value added chain in a particularly simple way. This is realized with the generic application programming interface (API), by means of which order structures can be configured and released and status information on the individual orders can be tracked by all authorized partners in real time.

Access to the communication platform is preferably realized by means of centralized web services. A user is provided with input means in the form of an intuitively operated order monitor, which makes it possible to access one, two or more modules of the communication platform.

Figure 2:
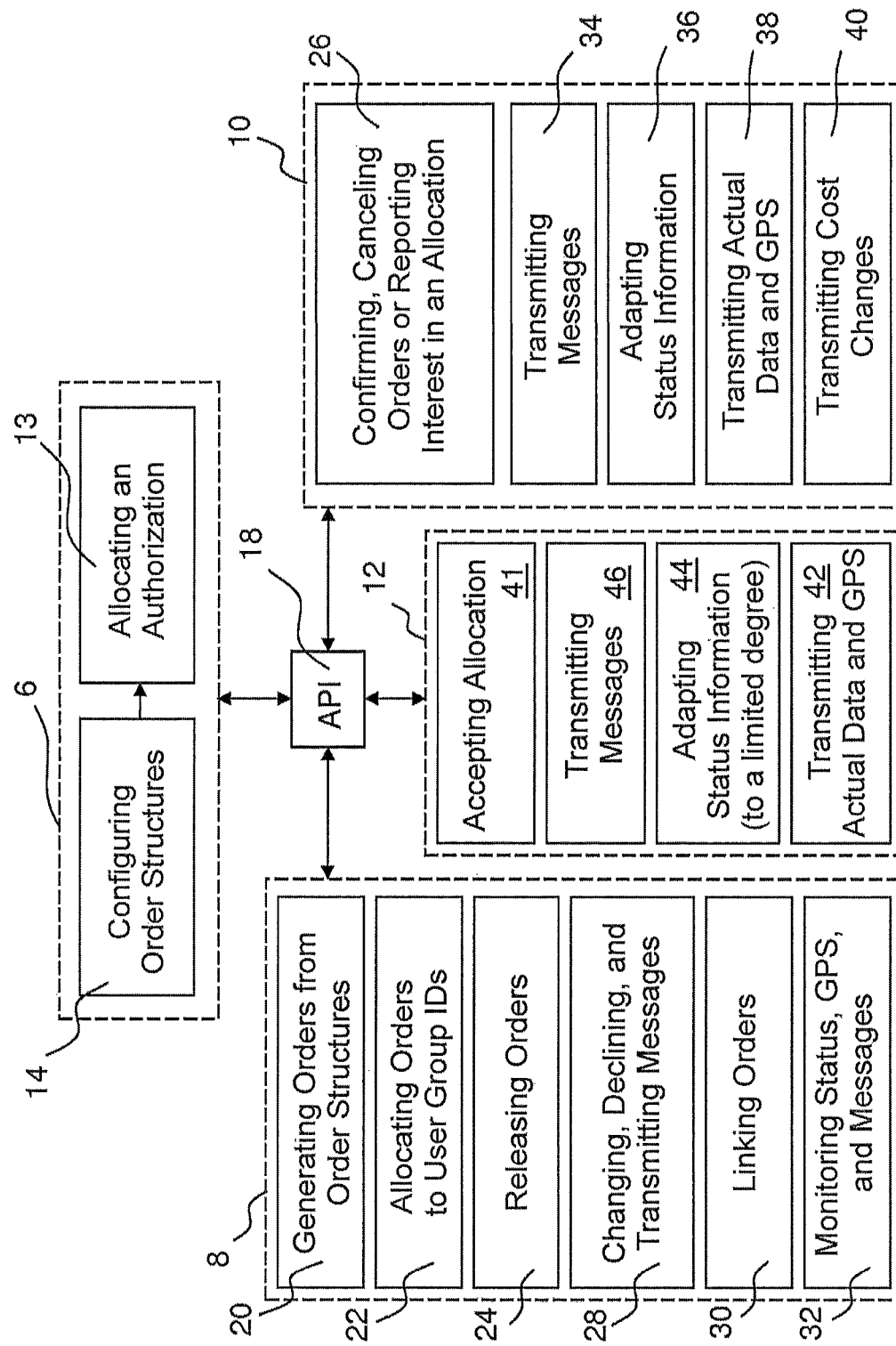

Other embodiments can be obtained from the claims, as well as the following detailed description of exemplary embodiments with reference to the drawings. In the drawings:

FIG. 1 shows a schematic representation of the individual modules of the communication platform, and FIG. 2 shows a block diagram for elucidating the inventive method for operating a communication platform.

In these figures, identical components are identified by the same reference symbols.

FIG. 1 shows a schematic representation of the individual modules of the communication platform 2 for linking collaborative processes, particularly communicative processes such as interactions with employees, external partners and customers in the workflow of a company. The communication platform 2 is accessed via a generic application programming interface (API) that links the individual modules to one another.

When the communication platform 2 is accessed, the authorization module 4 determines the access authorization, particularly an authorization as an administrator or the association with a user group or resource, based on the IDs associated with this access and can thereby authenticate the access to the communication platform 2. The communication platform 2 is therefore always accessed via the authorization module 4.

The order structure module 6 configures an order structure for the collaborative process and grants authorizations for generating and/or accepting an order with this order structure to individual user groups. The configuration of the order structure is realized by defining and specifying one or more registers with data fields. Depending on the properties of these data fields, the defined order structures can be accessed via the application programming interface without modifying the application programming interface itself.

The client module 8 essentially fulfills client functions and creates at least one order by selecting a corresponding order structure. However, an order can only be created if the authorization for generating the order is granted to the user group. Workflow progress information, which can be respectively associated with status information, is assigned to the order in accordance with the order structure. After the order has been created, it is assigned to an authorized user group ID for acceptance and further processing or released for acceptance to all authorized partners in the communication platform.

The contractor module 10 essentially fulfills contractor functions and confirms an order assigned to the user group ID, rejects this order for processing or accepts an order made available. If the order is confirmed and processed, the completion of the order is reported to the client module once the order has been completed in accordance with the workflow progress information. If applicable, the status information on the order is furthermore modified.

The resource module 12 is preferably a submodule of the contractor module 10 and essentially fulfills functions concerning the mobile resources of a contractor, wherein the mobile resources include individual machines and/or mobile employees. The resource module 12 advantageously makes it possible to accept assigned orders and to modify status information on the order to a limited degree, as well as to record associated detailed information such as actual data and GPS position data.

The inventive communication platform 2 particularly enables the control of cross-company and cross-system services, e.g. cross-carrier transports, with an information exchange in real time. This advantageously makes it possible to reduce error rates in the scheduling of orders, to reduce the processing times of individual orders and to improve the data quality within a process.

FIG. 2 shows a block diagram for elucidating the inventive method for operating the communication platform 2. In order to operate the communication platform 2, it is initially required to configure 14 one or more order structures with different data structures by means of the order structure module 6.

Subsequently, user groups or department groups for the companies participating in the collaborative process are created and an authorization to create an order and/or an authorization to accept an order having a previously configured order structure is granted 13 to each of these user groups. The configuration of the order structure 14 and the granting of an authorization 13 are preferably realized based on inputs of a user, particularly an administrator, with the aid of suitable input means of a data processing system.

The created order structures can be accessed from the modules of the communication platform 2 via the application programming interface (API) 18.

Employees of a company department can be respectively logged on to or registered in the communication platform 2 by means of a registration process. In order to ascertain the corresponding authentication, an authorization module 4, not shown here, checks the indicated administrator, resource and user group IDs, as well as the authorizations to access the order structures assigned to the IDs, based on values stored in the communication platform 2. In this case, a system user, who is authorized to create an order based on his association with the respective company department, was previously assigned to a user group ID within the value added chain and a system user, who is authorized to accept an order based on his association with the respective company department, was previously assigned to a user group ID within the value-added chain. In this context, it is entirely possible that both authorizations are granted to one user group ID. It is also possible that a system user is associated with multiple company departments.

A client module 8 then creates an order 20 based on inputs of a system user with a user group ID, to which the corresponding authorization for generating an order was granted, by selecting an order structure. At least one workflow information is associated with this order based on the associated order structure, wherein status information can be respectively associated with said workflow information. A timeframe for this order with a starting time and a completion time for processing the order is preferably defined by means of the client module 8. The input of additional information associated with the order, as well as the planned timeframe, is preferably realized based on inputs of a system user with the aid of suitable input means of a data processing system. Subsequently, this order is assigned 22 to a user group ID for processing and released 24 for processing or made available to all authorized partners due to its prior release. In this case, a release can be implicitly realized by allocating a user group ID.

A system user of the inventive communication platform 2 is always associated with a user ID when he initiates the generation of an order 20. In the real value added chain, this system user may be a client or a contractor or both if he creates other subcontracts or partial contracts as a contractor.

When a contractor in a value added chain makes a capacity request by making available an order inquiry concerning an existing data structure to other authorized partners or potential clients, the generation of this order 20 is likewise initiated by means of the client module 8 based on a user group ID.

This applies analogously to a system user of the inventive communication platform 2 who initiates the confirmation, rejection or acceptance 26 of an order. This system user has a user group ID and can confirm or reject 26 an assigned order. When a contractor in a value added chain makes a capacity inquiry by making available an order to other authorized partners, a client in the value added chain can accept this order by means of the contractor module 10 if he has a corresponding user group ID.

The client module 8 also makes it possible to change or cancel the order and/or to transmit a message associated with the order 28, as well as to associate orders 30 in order to link extensive collaborative processes.

Finally, the client module 8 also monitors status information, GPS position data and/or messages. 32 concerning the respective orders. The order is preferably monitored by means of an order monitor.

After the authentication by the communication platform 2 taking account of the user group ID and the corresponding authorization for accepting an order by means of the contractor module 10, the assigned and released orders can be accessed via the API 18 such that an assigned order can be rejected or confirmed 26, wherein the rejection or confirmation 26 is transmitted to the client module 8 via the API 18.

If the order is rejected 26, the user with client authorization typically assigns 22 this order to another user group ID.

The contractor module 10, the client module 8 and the resource module 12 make it possible to transmit 34 messages, which are preferably associated with individual orders, between the modules or within the contractor module 10 via the API 18.

The contractor module 10 enables all authorized partners to react to orders, which were made available and released by clients, but not assigned, with a message and to thereby report 26 their interest in the assignment of an order based on a user group ID.

An order can be alternatively initiated in the contractor module 10. The data set created on an order structure by a contractor with authorization to accept an order is considered as a capacity report for an order of this type and can be made available by being released to all authorized clients. The capacity report is converted into an order in the client module 8.

The contractor module 10 furthermore makes it possible to process and transmit digital data, e.g. the adaptation of status information 36, the transmission of actual data and/or GPS position data 38 and the transmission of cost changes 40, to other modules of the communication platform 2 via the API 18. In this way, collaborative processes, as well as the partners participating in the process, are linked via the communication platform 2.

Once the order is confirmed 26, this order can be separated into one or more partial orders if multiple employees or service providers are participating in the process, wherein these partial orders merely represent new orders that are associated with the original order.

The contractor module 10 can forward orders to the resource module 12 via the API 18. The individual order data is preferably transmitted to a mobile device, particularly a dynamic smartphone app for mobile employees, wherein only the data relevant to this partial order is transmitted in order to increase the order processing efficiency.

A starting time for the order processing is transmitted to the resource module 12 and mandatory inputs associated with the order, e.g. working steps, are processed and associated actual data and/or GPS position data are transmitted 42 to the contractor module 10, in both cases by means of the mobile device. Messages that are preferably associated with individual orders can furthermore be transmitted 46 to other modules of the communication platform or within the resource module 12 via the API 18. The resource module 12 modifies the status information 44 of the order based on this data of the mobile device, wherein the modification of the status information 44 is preferably realized to a limited degree in dependence on the data relevant to this order or partial order. The current status information can also be accessed from the client module 8 via the API 18 such that the entire process becomes transparent for all authorized partners.

In addition, an application for recording the working time and a continuous invoice verification may be provided in the communication platform 2, because the individual order data can be retrieved from multiple modules via the API 18.

The communication platform 2 and therefore the method for operating this communication platform 2 can be straightforwardly integrated into existing systems, e.g. shipping company software or ERP systems (Enterprise-Resource-Planning systems). The entire partner network participating in the value added chain or supply chain can be interlinked via the inventive communication platform 2 such that the entire collaborative process can be advantageously monitored in real time by respectively carrying out clearly structured and transparent order processing from the allocation of the order up to the confirmation of its completion.

An example of the configuration of an order structure 14 is described in greater detail below with reference to exemplary code, wherein one or more "registers" (tables) with data fields are defined and the properties of the registers and fields are specified:
ServiceType CreateServiceTypeAsPlatformAdmin(string name); (ServiceType=ID+Name)

The process structure ("service type") requires fields that are grouped into "registers" (tables):

```
long AddOrModifyRegister(Register register);
    class Register {
        String RegisterName { get; set; }
        String Classname { get; set; }
        String DependingClassname { get; set; }
        long ServiceTypeId { get; set; }
        RegisterField[ ] Fields { get; set; }
        IDValue[ ] SubRegisters { get; set; }}
    class RegisterField {
        long RegisterId { get; set; }
        String FieldName { get; set; }
        String Key { get; set; }
        TypeFormat Format { get; set; }
        // ...UNION of typed data ...}
```

Defined process structures can be accessed via the API 18 without modifying the API 18 itself.

If a mandatory entry in a field is expanded during the subsequent creation of a task, the class can be expanded:
bool IsPlannedValueMandatory {get; set;}

The class can likewise be expanded if field values are transmitted:
bool IsActualValueMandatory {get; set;}

In this case, a "register" may contain one or more "subregisters":
RegisterMAIN has classname: "class1"
RegisterSUB has classname: "class2" and DependingClassname: "class1"

In the following portion of the description, it is described in greater detail based on exemplary code how company and/or department groups can be established by means of a first authorization level and "create" and/or "accept" authorizations can be granted to these company or department groups:

```
long AddCompany(string name);
//Add a new company to the system
IDValue AddGroup(string name, long companyId);
//Define a new group (i.e. department within the company)
bool SetAcceptAuthorizationGroupServiceTypes(long groupId, long[ ] ServiceTypes)
//Authorize groups to accept one or more service types (as a contractor)
bool SetCreateAuthorizationGroupServiceTypes(long groupId, long[ ] ServiceTypes)
//Authorize groups to create services of one or more service types (as a principal)
```

These company groups are now able to create and accept orders with different order structures. Hereafter, a system user who creates an order is referred to as "owner" and a system user who accepts this order is referred to as "contractor."

An example of the generation of an order 20 is described in greater detail below with reference to exemplary code:

```
IDValue[ ] GetCreationServiceTypes( )
//Receive a List of the current group's rights for servicetypes to create
Service CreateService(Service toCreate)
//Additional Information stored in toCreate: TypeId, ...
Register GetRegister(long registerId)
//Receive a defined register by Id, from the created service
void UpdatePlannedFields(params RegisterField[ ] fields)
//Update the register field entries by defining planned values for task instructions
IDValue[ ] GetAssignableGroups(long serviceTypeId)
//Receive a list of available departments, these departments are "valid" to be
//assigned to the given servicetype Id
bool AssignService(long serviceId, long contractorId)
//Assign a department of a company to the service //- this department will be ordered to run and finish the service
```

The inventive API 18 can be used for the communication in an ERP or PPS system in order to utilize the order structures established in the communication platform 2.

An example of the acceptance of orders 26 is described in greater detail below with reference to exemplary code, wherein a contractor can periodically search for newly created orders within the communication platform 2:

```
ServiceOverview[ ] GetUnknownServiceOverviewRangeAllTime(bool withMandatoryEntries, bool markasknown);
//Application integration method, used to synchronize mandatory fields or service
//status values, in that case the parameters would be (FALSE, TRUE)
bool ConfirmService(long serviceId)
//Confirm the service (that you are willing to process the task)
```

System users may be persons or machines that can be assigned to the individual orders. However, these system users typically have no read and write access to the tasks they should process:

```
IDValue[ ] GetAssignableRessources(long serviceId)
Get a list of valid resource users for the given service
bool AssignServiceResource(long serviceId, long? ressourceId)
Assign a resource user to the given service Id
    class ServiceOverview {
        long ServiceId { get; set; }
        IDValue ServiceType { get; set; }
        TypeStatus Status { get; set; }
        long? AssignedGroup { get; set; }
        long? AssignedUser { get; set; }
        RegisterField[ ] MandatoryFields { get; set; }}
```

The generation of partial orders is identical to the generation of an order 20, but additionally associated with a master order. In other words, a system user subordinate to the contractor receives a task via the resource module 12 and accepts this assignment 41.

An example of the modification of status changes 36 is described in greater detail below with reference to exemplary code, wherein a contractor initially retrieves an overview of all orders, in which he participates:

```
ServiceList GetServicesContextBasedPaged(TypeFilter filter) int skip,
int take)
//Receive a list of tasks depending on a defined filter
ServiceList GetServicesBySearchKeyword(string searchString,
TypeSearchField field, bool containsOrStartsWith, int skip, int take)
//Receive a list of tasks depending on a defined search-keyword
ServiceList GetServiceRepresentationsDateRange(DateTime from,
DateTime till)
//Receive a list of tasks of a given period of time
```

Each individual order has an order structure, by means of which current field values, particularly measuring data, can be processed and transmitted:

```
Service GetService(long serviceId)
//Load further informations about the service
void ServiceResourceApprove(long serviceId)
//Approve the service (so that your department knows that you have
read and approved //to process the task)
void StartServiceProcess(long serviceId, DateTime startingTime)
//Start executing the task, Status = InProcess
Register GetRegister(long registerId)
//Receive a defined register by Id, from the created task
void UpdateActualFields(params RegisterField[ ] fields)
//Write new actual field entries onto the service
void FinishService(long serviceId, DateTime endingTime)
//Finish executing the service
class Service {
    IDValue Parent { get; set; }
    IDValue[ ] Childs { get; set; }
    string Name { get; set; }
    TypeStatus State { get; set; }
    String TypeName { get; set; }
    IDValue[ ] Registers { get; set; }
    IDValue Owner { get; set; }
    IDValue Contractor { get; set; }
    IDValue AssignedUser { get; set; }
    TypeStatusTransition[ ] PossibleStatusChanges { get; set; } }
```

In this case, "PossibleStatusChanges" shows a plurality of potential actions in dependence on the current status information, wherein typical status information items include:

```
            enum TypeStatus {
                Initial,
                Refused,
                Assigned,
                Changed,
                Confirmed,
                InProcess,
                Finished,
                Cancelled,
                Invoiced }
```

A system user who is authorized to create a task will search for new orders with the status "incoming" within the communication platform 2 in regular intervals:

```
ServiceOverview[ ] GetUnknownServiceOverviewRangeAllTime(bool
withMandatoryFields, bool markasknown);
Application integration method, used to synchronize mandatory fields
or service status values, in that case the parameters would be
(TRUE, TRUE)
```

It is advantageous that no further actions via the API 18 are required because the "serviceOverview" already provides the current status information and mandatory field entries are made during the order processing. System users within the company groups, such as schedulers in the processing department, also have access to the status information and the actual data of the individual orders.

The inventive communication platform 2 is advantageously able to associate multiple orders with one another. These associations or links can be set up as follows:

Automatic associations: based on common "information" from all service providers, for example a common subordinate task or a common field entry such as "container" or "truck." In this way, tasks can also be easily linked across company boundaries. Naturally, the link can be optionally limited to within the company boundaries.

Manual Association: by the system user generating a task if this system user has additional external information on the collaborative process.

```
void UpdateServiceLinks(long serviceId, params long[ ]
connectedServiceIds)
Requesting a set of linked Services is done by calling:
LinkInformation[ ] GetServiceLinks(long serviceId)
class LinkInformation {
    IDValue Service { get; set; } }
```

All features disclosed in the preceding description, as well as in the claims, can be combined with the features of the independent claims individually, as well as in arbitrary combinations. The disclosure of the invention is therefore not limited to the described or claimed combinations of features. In fact, all meaningful combinations of features within the scope of the invention should be considered as being disclosed.

The invention claimed is:

1. An assembly comprising:
a remote computer and a plurality of partner computers, wherein the remote computer is programmed to execute a communication platform for exchanging digital data within a value added chain using at least one or more orders, wherein each individual order of the one or more orders has an order structure comprising digital data which is used online in modules of the communication platform via a generic application programming interface, and wherein the communication platform features at least the following modules stored in memory of the remote computer or the plurality of partner computers:
(i) an order structure module, that is designed such that when executed, is
a) to configure at least one such order structure of the at least one or more orders during operation at runtime of the communication platform so that the at least one such order structure is configured and released online so that ad hoc processes are changed and added to the communication platform quickly and without downtime, b) to grant to one or more user groups for each order structure of the at least one or more orders an authorization for the one or more user groups to create or to accept an order of the at least one or more orders and c) to grant to at least one user group ID participating in the value added chain an authorization to create an order of the at least one or more orders and to grant to at least one other user group ID an authorization to accept the order, (ii) a client module, that is designed such that when executed, is a) to generate at least one such order, wherein the at least one such order is created by selecting a corresponding order structure, for which the user group ID has an authorization required to create the at least one such order, and wherein the order is associated with workflow information, with which one status information is respectively associated, and b) to assign and release the at least one order to a user group ID or release the at least one order to one or more user group IDs for the purpose of an assignment and (iii) a contractor module, that is designed such that when executed, is a) to confirm or reject the at least one such order assigned to a user group ID or report an interest in the assignment of a released order and b) to process the at least one such order when confirmed in accordance with at least one workflow information item assigned to the at least one such order and modify status information of the at least one such order, and (iv) wherein the generic application programming interface connects to the modules of the communication so that digital data of the corresponding order structure is used in all modules, a specific order is used by the client module and the contractor module, and orders having different order structures are linked to one another.

2. The assembly according to claim 1, wherein the communication platform further comprises a resource module stored in the memory, wherein the resource module is designed such that, when executed, assigns at least one order to mobile resources and provides the digital data of the at least one order of the communication platform so assigned to a mobile resource of the mobile resources.

3. The assembly according to claim 1, wherein the communication platform further comprises an authorization module stored in the memory, wherein the authorization module is designed such that, when executed, sets up two authorization levels for accessing the communication platform, wherein an administrator authorization is designed for granting access to administrative tasks within the communication platform and a processing authorization is signed for granting access to operative tasks within the communication platform.

4. The assembly according to claim 3, in which the authorization module is furthermore is designed, when executed for authenticating access to the communication platform based on an administrator ID, a resource ID, and/or a user group ID.

5. The assembly according to claim 1, in which the at least one such order has a timeframe with a starting time and a completion time, wherein this timeframe is specified during the generation of the at least one such order using the client module or during the acceptance of the at least one such order using the contractor module.

6. The assembly according to claim 1, in which the at least one such order structure has one or more fields, wherein predefined operating modes and/or mandatory inputs are assigned to the fields during the configuration of the at least one such order structure.

7. The assembly according to claim 6, in which recorded actual data forms a mandatory input of a field of the at least one such order structure and status information of the at least one such order is created based on the recorded actual data.

8. The assembly according to claim 1, in which at least one order of the one or more orders is separated into multiple partial orders.

9. The assembly according to claim 1, in which one or more GPS trackers is assigned to at least one order of the one or more orders.

10. The assembly according to claim 1, in which working times are recorded, wherein these working times are order-independent or associated with an order of the one or more orders.

11. The assembly according to claim 1, wherein the modules of the communication platform are connected by the generic application programming interface in such a way that digital data of the corresponding order structure is used online in all modules via the generic application programming interface, a specific order from the client module and the contractor module is used, and orders of the one or more orders having arbitrary order structures are associated with one another.

12. A method for operating a communication platform for exchanging digital data within a value added chain using at least one or more orders, wherein each individual order of the at least one or more orders has an order structure comprising digital data which is stored in modules of the communication platform, with said method comprising the following steps:

configuring at least one such order structure of the at least one or more orders using an order structure module that is designed to configure the at least one such order structure during operation at runtime of the communication platform so that the at least one such order structure is configured and released online so that ad hoc processes are changed and added to the communication platform quickly and without downtime, granting to one or more user groups for each order structure of the at least one or more orders at least one authorization right comprising an authorization for the one or more user groups to create or to accept an order of the at least one or more orders, granting to at least one user group ID participating in the value added chain an authorization to create an order of the at least one or more orders and to grant to at least one other user group ID an authorization to accept the order, creating at least one such order by means of a client module, wherein the at least one such order is created by selecting a corresponding order structure, for which the user group ID has an authorization required to create the at least one such order, and wherein the at least one such order is associated with workflow information, with which one workflow status information item is respectively associated, assigning and releasing the at least one such order to at least one user group ID as a contractor or releasing the at least one order for assignment to at least one user group ID using the client module, confirming or rejecting the assigned at least one such order to a user group ID or reporting interest in an assignment of an order previously released by a contractor module to at least one user group ID, processing the at least one such order when confirmed in accordance with at least one workflow information item assigned to the at least one such order and modifying status information associated with the workflow information, wherein the status information is status information on the at least one such order, and transmitting digital data of the at least one such order between the modules of the communication platform, including the order structure module, the client module, and the contractor module, using a generic application programming interface in such a way that the status information on the at least one such order is accessible by at least two of the modules of the communication platform.

13. The method according to claim 12, featuring the following additional step:

assigning the at least one order from the contractor module to a resource ID by utilizing a resource module in order to adapt status information on the order and to gather digital data of the order.

14. A non-transitory computer readable medium storing instructions that, when executed by a computer, cause the computer to perform a method for operating a communication platform for exchanging digital data within a value added chain using at least one or more orders, wherein each individual order of the at least one or more orders has an order structure comprising digital data which is stored in modules of the communication platform, with said method comprising the following steps:

configuring at least one such order structure of the at least one or more orders using an order structure module that is designed to configure the at least one such order structure during operation at runtime of the communication platform so that the at least one such order structure is configured and released online so that ad hoc processes are changed and added to the communication platform quickly and without downtime, granting to one or more user groups for each order structure of the at least one or more orders at least one authorization right comprising an authorization for the one or more user groups to create or to accept an order of the at least one or more orders, granting to at least one user group ID participating in the value added chain an authorization to create an order of the at least one or more orders and to grant to at least one other user group ID an authorization to accept the order, creating at least one such order by means of a client module, wherein the at least one such order is created by selecting a corresponding order structure, for which the user group ID has an authorization required to create the at least one such order, and wherein the at least one such order is associated with workflow information, with which one workflow status information item is respectively associated, assigning and releasing the at least one such order to at least one user group ID as a contractor or releasing the at least one order for assignment to at least one user group ID using the client module, confirming or rejecting the assigned at least one such order to a user group ID or reporting interest in an assignment of an order previously released by a contractor module to at least one user group ID, processing the at least one such order when confirmed in accordance with at least one workflow information item assigned to the at least one such order and modifying status information associated with the workflow information, wherein the status information is status information on the at least one such order, and transmitting digital data of the at least one such order between the modules of the communication platform, including the order structure module, the client module, and the contractor module, using a generic application programming interface in such a way that the status information on the at least one such order is accessible by at least two of the modules of the communication platform.

* * * * *